United States Patent [15] 3,707,680
Gabbard et al. [45] Dec. 26, 1972

[54] DIGITAL DIFFERENTIAL PULSE CODE MODULATION SYSTEM

[72] Inventors: O. Gene Gabbard, Germantown, Md.; Pradman Kaul, Berkeley, Calif.

[73] Assignee: Communication Satellite Corporation

[22] Filed: May 20, 1970

[21] Appl. No.: 38,951

[52] U.S. Cl. ..............325/38 B, 178/DIG. 3, 178/67, 179/15 AE, 179/15 AP, 179/15 AZ, 179/15 BW, 325/30, 325/38 R, 325/41, 325/42

[51] Int. Cl. ................................................H04b 1/00

[58] Field of Search ....179/15.55 R, 15.55 T, 15 AC, 179/15 AP, 15 AV, 15 BW, 15 AZ, 15 BS, 15 AE; 340/347 DD, 146.2, 204, 146.1 D, 146.1 AL; 325/38 B, 38 R, 38 A, 30, 320; 178/DIG. 3, 67, 41, 42; 332/11 D; 328/157

[56] References Cited

UNITED STATES PATENTS

| | | | |
|---|---|---|---|
| 3,026,375 | 3/1962 | Graham | 325/38 B |
| 3,462,686 | 8/1969 | Shutterly | 325/38 B |
| 3,339,142 | 8/1967 | Varsos | 325/38 B |

*Primary Examiner*—Albert J. Mayer
*Attorney*—Martin C. Fliesler

[57] ABSTRACT

Apparatus and method are disclosed for a differential pulse code modulated system. The system transmits the difference between a given sample of the input signal and an estimated value of the given sample which is determined from previous estimated samples. The differential signal is fed back to an all digital loop to provide an estimated sample without undue delay.

14 Claims, 18 Drawing Figures

DIGITAL DIFFERENTIAL PULSE CODE MODULATION SYSTEM

BACKGROUND OF THE INVENTION

The invention relates generally to a bandwidth reduction technique for a communications system employing differential encoding and more particularly to a system employing differential pulse code modulation (DPCM) and having an all-digital feed-back loop for generating and receiving the DPCM signals.

A DPCM system differs from standard pulse code modulation (PCM) in that instead of transmitting the absolute value of the input signal the DPCM system transmits the difference between the given sample of the input signal and an estimated value of the given input signal. The estimated sample is determined from a previous sample or samples. A DPCM system is most advantageously employed when the input signal is highly correlated, that is, the probability of more than a small difference in amplitude between successive samples is very small. An example of such a signal is a television signal in which the difference in amplitude between successive samples or adjacent dots along the scan line is likely to be less than 10 percent of the total dynamic range of the amplitude of the signal. Thus by putting all of the encoding power of the system in the difference between successive samples rather than the entire range of the input signal, the signal to quantization noise of the system may be enhanced because smaller steps may be used.

In one type of prior art system according to R. E. Graham in U.S. Pat. No. 2,905,756, a DPCM system is disclosed having a predictor that is not based on past samples but rather is based on a linear approximation. One disadvantage of such a system is that the system is not self-correcting. For example, in a DPCM system having a feedback, if an error is made it will be corrected in the next cycles. By using a feedback loop the transmitted differential signals are also fed back into the system and used to reconstruct the previous input sample. The reconstructed sample is then compared to the next input sample to produce a differential signal which again is fed back to reconstruct the previous input sample. Thus, if an input signal should be generated that is larger than it should be, the differential signal produced will be large than it should be but it will be used to reconstruct that larger input sample so as to compare the reconstructed sample to the next input sample. In this manner, the present system is self-correcting and errors that would otherwise be cumulative are avoided.

In another type of prior art system described by J. B. O'Neal, Jr. in the Bell System Technical Journal for January, 1966 at page 117, a DPCM system employing prediction based on past samples is shown; however, the feedback loop includes the PCM encoder and PCM decoder, as well as other analog components. If a sampling rate of 10 MHz is required, the sampling rate required for a 4.5 MHz bandwidth television signal, then the total propagation delay of the loop has to be less than 100 nanoseconds. With present state of the art, this is very difficult to obtain with both the encoder and decoder in the loop. A second problem is with the analog storage represented by the sample and hold circuit of O'Neal. Because no two digital-to-analog (D/A) converters are exactly alike and because of the analog memory, the differences between encoder and decoder D/A converters will lead to an accumulation of error.

SUMMARY OF THE INVENTION

A high speed differential PCM system is provided wherein an input analog signal is encoded by a standard PCM encoder into $n$-bit words. The encoder $n$-bit word outputs are then fed to a DPCM system wherein $n$-bit words are truncated to $n$ two-bit words, fed back into an all digital loop system and are transmitted over a digital channel to a receiving system wherein the $n$ two-bit words are reconverted back into $n$-bit words for decoding into an analog representation of the original analog input signal. In the transmitter section the $n$-bit word input is first applied to a digital subtractor register wherein the estimated value of the sample is subtracted from the particular input sample thus producing a difference signal of $n$-bit length. The difference signal is then operated on by a subtraction algorithm logic circuit to produce the $n$ two-bit output word for transmission. The output is also processed in an all digital feedback loop that generates predicted values of the particular sample inputs for application to the digital subtractor register. The receiver portion of the circuit receives the $n$ two-bit words and processes them in a digital loop arrangement to regenerate the original $n$-bit word samples for application to a PCM decoder. It should be noted that the all digital feedback loop of the present system solves the propagation delay problem. The entire loop is digital, and neither the encoder or decoder are in the loops. Hence the propagation delay in the loops can easily be made under 100 nanoseconds because the loop contains only high-speed digital circuits. In addition, either linear or non-linear quantization may be employed and embodiments employing both approaches will be disclosed hereinafter.

DESCRIPTION OF THE PREFERRED EMBODIMENTS

Figure 1:
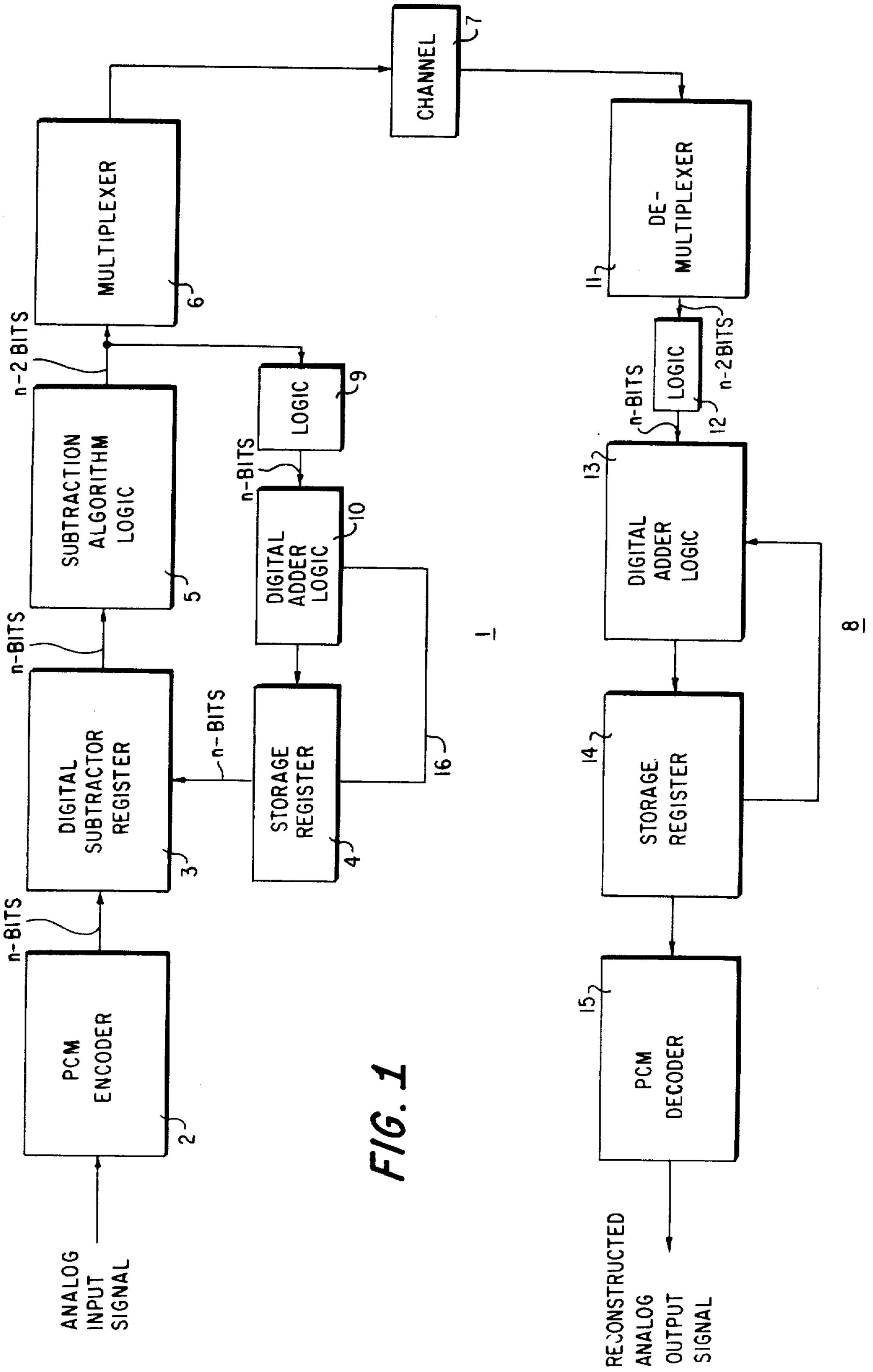
FIG. 1 shows a block diagram of a linear embodiment of the DPCM system according to this invention.

Referring now to FIG. 1 wherein a block diagram of an embodiment of the digital DPCM system according to this invention is shown, an analog input signal in the transmit portion 1 of the system is applied to the conventional PCM encoder 2 that provides an *n*-bit word output signal for each analog sample. The encoder output is applied to a digital subtractor register 3. The subtractor also receives an *n*-bit word from the storage register 4. As will be described hereinafter, the word received from the storage register is an estimate of the sample being applied to the digital subtractor register 3 from the encoder 2; the estimate is based on previous transmitted samples. It will become apparent that the estimated sample may or may not be identical to the present sample depending on how large a portion of the dynamic range is jumped between successive input samples. Digital subtractor register 3 has an output that is applied to a subtraction algorithm logic circuit 5. Depending on the desired fidelity of the reconstructed signal at the receiver output of the system the algorithm may be chosen so as to truncate one, two, three, or even more bits of the *n*-bit signal from the subtractor 3. As one example, for an algorithm logic output of *n* two-bits the dynamic range of the input signal is compressed one-fourth. Thus we need to transmit only $N/4$ levels (where $N=2^n$). The subtraction algorithm logic circuit 5 operates under the following conditions:

1. The output is in the straight binary code;
2. If $A_s$ is greater than $A_{s-1}$ by more than $N/8$ levels, where $A_s$ is the present sample and $A_{s-1}$ is the estimate of the present sample, then transmit all 1's;
3. If $A_{s-1}$ is greater than $A_s$ by more than $N/8$ levels then transmit all 0's.

The *n* two-bit subtraction algorithm logic 5 output is applied to a conventional multiplexer 6 for transmission over a channel 7 to the receiver portion 8 of the system. Channel 7 may be any type of communication link having a bandwidth and noise figure commensurate with the requirements for the signal output of multiplexer 6. For example, channel 7 may comprise a cable link, a microwave link, or an earth station – satellite – earth station link. Multiplexer 6 also receives a reset pulse "G" that is described in detail hereinafter. Depending on the type of communications involved, multiplexer 6 may also receive other inputs. For example, in television transmission the voice information and retrace blanking and frame synchronization information is transmitted. In the case of television, it may be assumed that the analog video signal without any blanking or sync information is being applied to the DPCM system input.

Logic 5 output is also applied to an all digital feedback loop containing logic circuit 9 that converts the *n* two-bit word into an *n*-bit word. The manner of conversion is discussed with reference to FIG. 3, hereinafter. The *n*-bit logic 9 output is applied to a digital adder logic 10 that also receives an *n*-bit output from the storage register 4 in a second feedback loop arrangement via line 16. The operation of transmitter section 1 will be explained in greater detail in the discussion of the subsequent figures.

In the receiver portion 8, de-multiplexer 11 provides an *n* two-bit output to logic circuit 12. Logic circuit 12, digital adder logic 13 and storage register 14 operate in the same manner as logic 9 and 10, respectively, and register 4 of transmitter 1. Storage register 14 provides an *n*-bit output to PCM decoder 15 that provides an analog output signal which is a reconstruction of the analog input signal to transmitter 1.

Figure 2:
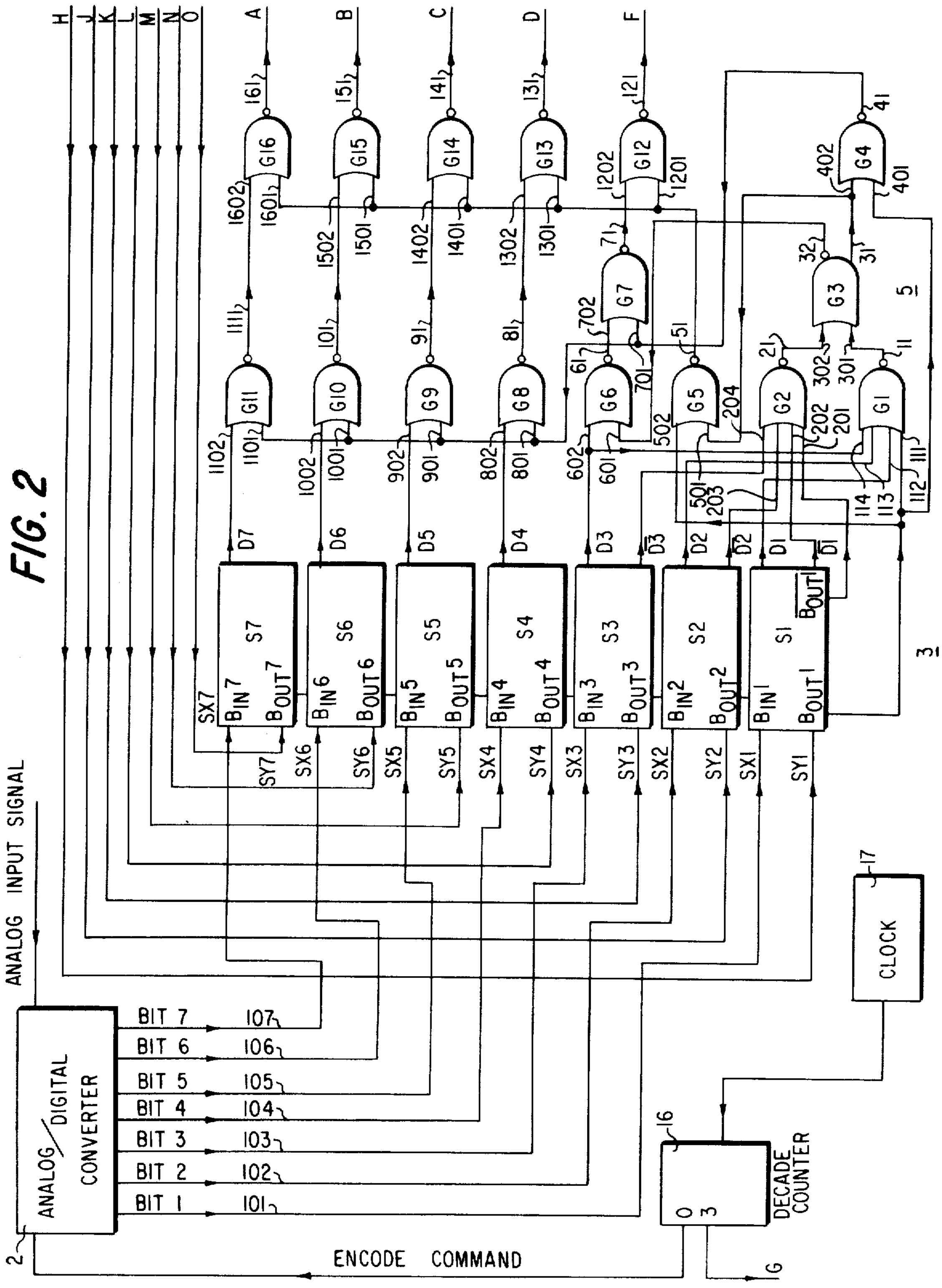
FIG. 2 is a block diagram showing in greater detail a part of the transmitter portion of the system in FIG. 1.

Referring now to FIG. 2 a portion of the transmitter 1 is shown in greater detail. As an example, the PCM encoder 2 may be an analog/digital (A/D) converter having a seven bit parallel output on lines 101–107. Line 101 carries the most significant bit, bit 1. PCM encoder 2, encodes on command from a decade counter 16. Decade counter 16 is driven by a clock 17 that has a frequency chosen depending on the type of analog input signal. On count 0, decade counter 16 commands the PCM encoder to sample; on count 3 a pulse is placed on line G that is used to read in new values into the storage registers. Analog/digital (A/D) converter 2 provides output bits 1–7 on lines 101–107 which are then applied to inputs SX1 through SX7 of digital subtractors S1 through S7, respectively, that comprise digital subtractor register 3. A second set of inputs SY1 through SY7 on lines H, J, K, L, M, N, and O, respectively, from the all digital feedback loop, described in greater detail below, are applied to subtractors S1 through S7, respectively, to provide difference outputs D1 through D7 and "not" difference outputs $\overline{D1}$ through $\overline{D3}$. Each subtractor has its "borrow-in" ($B_{IN}$) output connected to the "borrow-out" ($B_{OUT}$) of input of the next highest numbered subtractor, viz. $B_{IN}1$ of S1 is connected to $B_{OUT}2$ of S2, etc. It will be noted that $B_{OUT}1$ and $\overline{B_{OUT}1}$ are connected to further circuitry described later. It will become apparent in the discussion, that a signal at $B_{OUT}1$ indicates an "overflow" condition, that is the register capacity has been exceeded. The following table illustrates the operation of the subtractor S1 thereby illustrating the operation of all the subtractors:

| $B_{IN}1$ | SX1 | SY1 | D1 | $\overline{D1}$ | $B_{OUT}1$ | $\overline{B_{OUT}1}$ |
|---|---|---|---|---|---|---|
| 0 | 0 | 0 | 0 | 1 | 0 | 1 |
| 0 | 0 | 1 | 0 | 1 | 1 | 0 |
| 0 | 1 | 0 | 1 | 0 | 0 | 1 |
| 0 | 1 | 1 | 0 | 1 | 0 | 1 |
| 1 | 0 | 0 | 1 | 0 | 1 | 0 |
| 1 | 0 | 1 | 0 | 1 | 1 | 0 |
| 1 | 10 | 0 | | 1 | 0 | 1 |
| 1 | 1 | 1 | 0 | 1 | 1 | 0 |

The inputs at SX1 – SX7 represent $A_s$, the present sample, and the inputs at SY1 – SY7 represent $A_{S-1}$, the predicted present sample received from the feedback loop. As an example, let $A_s$ = 0000000 and $A_{S-1}$ = 0010110. The difference output at D1 – D7 is 1101010 with overflow because $A_{S-1}$ is larger than $A_s$. The number 1101010 is the two's complement of 0010110 and is a useful way to represent negative numbers because addition may be performed without regard to the sign of the augend or addend, and the sum will be correct both in magnitude and in sign. For a discussion of this property of binary numbers see *Logical Design of Digital Computers* by Montgomery Phister, Jr., John Wiley & Sons, Inc., New York (1958), pages 278–295. It will become apparent that the digital adder logics 10 and 13 make use of this property to perform addition and subtraction solely through the use of adders.

The outputs of subtractors S1 – S7 are applied to subtraction algorithm logic circuit 5 comprising OR gates G1 – G16. A circle on a gate output indicates a "-not" output. Thus, for example, a table for G3 would be:

| line 302 | line 301 | line 31 | line 32 |
|---|---|---|---|
| 0 | 0 | 0 | 1 |
| 0 | 1 | 1 | 0 |

| | | | |
|---|---|---|---|
| 1 | 1 | 1 | 0 |
| 1 | 0 | 1 | 0 |

The $B_{OUT}1$ output of subtractor S1 is applied to input 111 of gate G1 and also to input 401 of gate G4. The $\overline{B_{OUT}1}$ of subtractor S1 is applied to input 201 of gate G2 and to input 502 of gate G5. The $\overline{D1}$ output of subtractor S1 is applied to input 202 of gate G2. The D1 output of subtractor S1 is applied to input 112 of gate G1. The $\overline{D2}$ output of subtractor S2 is applied to input 203 of gate G2 and the D2 output is applied to input 113 of gate G1. The $\overline{D3}$ output of subtractor S3 is applied to input 204 of gate G2. The output D3 of subtractor S3 is applied to input 602 of gate G6 and to input 114 of gate G1. Output line 11 of gate G1 is applied to input 301 of gate G3 and output line 21 of gate G2 is applied to input 302 of gate G3. Output line 32 of gate G3 is applied to input 601 of gate G6 and output line 31 of gate G3 is applied to input 402 of gate G4 and input 501 of gate G5. G4 output line 41 is applied to input 701 of gate G7 and to input 801 of gate G8, input 901 of gate G9, input 1001 of gate G10 and input 1101 of gate G11. Output line 51 of gate G5 is applied to input 1201 of gate G12, input 1301 of gate G13, input 1401 of gate G14, input 1501 of gate G15 and input 1601 of gate G16. The output line 61 of gate G6 is applied to input 702 of gate G7 and the output 71 of gate G7 is applied to input line 1202 of gate G12. The output 81 of gate G8 is applied to the input 1302 of gate G13, the output 91 of gate G9 is applied to the input 1402 of gate G14, the output 101 of gate G10 is applied to the input 1502 of gate G15, and the output 1111 of gate G11 is applied to the input 1602 of gate G16. The outputs 121, 131, 141, 151 and 161 of gates G12, G13, G14, G15, and G16 on lines thus respectively, are applied to the logic circuit 9 and to the digital adder logic 10 shown in greater detail in FIG. 3. The outputs of gates of G12 through G16 also constitute the output of the transmitter section which is applied to the multiplexer 6 for transmission over the channel 7 to the receiver section 8 of the system.

In order to satisfy the condition expressed above for the transmitted code, the subtraction algorithm logic circuit 5 operates as follows for four different output conditions of subtractors S1 – S7:

I. If there is no overflow and D1, D2, and D3 are all not 0's, transmit D3, D4, D5, D6, and D7 as all 1's. This is the case where $A_s > A_{s-1}$ by 15 steps or more.

II. If there is no overflow and D1, D2, and D3 are all 0's, transmit D3 as a 1 and transmit D4, D5, D6, and D7 as they are. This is the case where $A_s \geq A_{s-1}$ by less than 15 steps.

III. If overflow and D1, D2, D3, are all 1's transmit D3 as 0 and transmit D4, D5, D6 and D7 as they are. This is the case where $A_{s-1} \geq A_s$ by less than 16 steps.

IV. If overflow and D1, D2, and D3, are all not 1's transmit D3, D4, D5, D6 and D7 as all 0's. This is the case where $A_{s-1} > A_s$ by 16 steps or more.

Thus for any given reference point the system has a dynamic range of plus 15 steps or minus 16 steps, or a total of 32 steps (counting zero), one-fourth the entire dynamic range of 128 steps. The following table indicates the five digit transmit signals for various positive and negative steps around a given reference point. It will be apparent that for the case when the system begins at the lowest possible step or the highest possible step that it will take eight or more transmitted cycles for the system to swing through the entire dynamic range:

| (a) | (b) |
|---|---|
| 15 | 11111 |
| 14 | 11110 |
| 13 | 11101 |
| 12 | 11100 |
| 11 | 11011 |
| 10 | 11010 |
| 9 | 11001 |
| 8 | 11000 |
| 7 | 10111 |
| 6 | 10110 |
| 5 | 10101 |
| 4 | 10100 |
| 3 | 10011 |
| 2 | 10010 |
| 1 | 10001 |
| 0 | 10000 |
| −1 | 01111 |
| −2 | 01110 |
| −3 | 01101 |
| −4 | 01100 |
| −5 | 01011 |
| −6 | 01010 |
| −7 | 01001 |
| −8 | 01000 |
| −9 | 00111 |
| −10 | 00110 |
| −11 | 00101 |
| −12 | 00100 |
| −13 | 00011 |
| −14 | 00010 |
| −15 | 00001 |
| −16 | 00000 |

*a* is the difference in steps between $A_s$ and $A_{s-1}$; *b* is the code transmitted.

It will be apparent that if one chooses to transmit a four digit code instead of five digits, that a similar code may be established for a range of +7 steps and −8 steps. In the same way the principle applies to truncating an eight-bit word to transmit a six-bit sample, and so on.

The following examples will illustrate the operation of the subtraction algorithm circuit 5 for the four cases of the algorithm:

| | I | II | III | IV |
|---|---|---|---|---|
| $B_{OUT}1$ | 0 | 0 | 1 | 1 |
| $\overline{B_{OUT}1}$ | 1 | 1 | 0 | 0 |
| D1 | 0 | 0 | 1 | 1 |
| $\overline{D1}$ | 1 | 1 | 0 | 0 |
| D2 | 0 | 0 | 1 | 1 |
| $\overline{D2}$ | 1 | 1 | 0 | 0 |
| D3 | 1 | 0 | 1 | 0 |
| $\overline{D3}$ | 0 | 1 | 0 | 1 |
| D4 | d4 | d4 | d4 | d4 |
| D5 | d5 | d5 | d5 | d5 |
| D6 | d6 | d6 | d6 | d6 |
| D7 | d7 | d7 | d7 | d7 |
| 111 | 0 | 0 | 1 | 1 |
| 112 | 0 | 0 | 1 | 1 |
| 113 | 0 | 0 | 1 | 1 |
| 114 | 1 | 0 | 1 | 0 |
| 11 | 0 | 1 | 0 | 0 |
| 201 | 1 | 1 | 0 | 0 |
| 202 | 1 | 1 | 0 | 0 |
| 203 | 1 | 1 | 0 | 0 |
| 204 | 0 | 1 | 0 | 1 |
| 21 | 0 | 0 | 1 | 0 |
| 301 | 0 | 1 | 0 | 0 |
| 302 | 0 | 0 | 1 | 0 |
| 31 | 0 | 1 | 1 | 0 |
| 32 | 1 | 0 | 0 | 1 |
| 401 | 0 | 0 | 1 | 1 |
| 402 | 0 | 1 | 1 | 0 |
| 41 | 1 | 0 | 0 | 0 |
| 501 | 0 | 1 | 1 | 0 |
| 502 | 1 | 1 | 0 | 0 |
| 51 | 0 | 0 | 0 | 1 |
| 601 | 1 | 0 | 0 | 1 |
| 602 | 1 | 0 | 1 | 0 |
| 61 | 0 | 1 | 0 | 0 |
| 701 | 1 | 0 | 0 | 0 |
| 702 | 0 | 1 | 0 | 0 |

| | | | | |
|---|---|---|---|---|
| 71 | 0 | 0 | 1 | 1 |
| 801 | 1 | 0 | 0 | 0 |
| 802 | d4 | d4 | d4 | d4 |
| 81 | 0 | $\overline{d4}$ | $\overline{d4}$ | $\overline{d4}$ |
| 901 | 1 | 0 | 0 | 0 |
| 902 | d5 | d5 | d5 | d5 |
| 91 | 0 | $\overline{d5}$ | $\overline{d5}$ | $\overline{d5}$ |
| 1001 | 1 | 0 | 0 | 0 |
| 1002 | d6 | d6 | d6 | d6 |
| 101 | 0 | $\overline{d6}$ | $\overline{d6}$ | $\overline{d6}$ |
| 1101 | 1 | 0 | 0 | 0 |
| 1102 | d7 | d7 | d7 | d7 |
| 1111 | 0 | $\overline{d7}$ | $\overline{d7}$ | $\overline{d7}$ |
| 1201 | 0 | 0 | 0 | 1 |
| 1202 | 0 | 0 | 1 | 1 |
| *121 | 1 | 1 | 0 | 0 |
| 1301 | 0 | 0 | 0 | 1 |
| 1302 | 0 | $\overline{d4}$ | $\overline{d4}$ | $\overline{d4}$ |
| *131 | 1 | d4 | d4 | 0 |
| 1401 | 0 | 0 | 0 | 1 |
| 1402 | 0 | $\overline{d5}$ | $\overline{d5}$ | $\overline{d5}$ |
| *141 | 1 | d5 | d5 | 0 |
| 1501 | 0 | 0 | 0 | 1 |
| 1502 | 0 | $\overline{d6}$ | $\overline{d6}$ | $\overline{d6}$ |
| *151 | 1 | d6 | d6 | 0 |
| 1601 | 0 | 0 | 0 | 1 |
| 1602 | 0 | $\overline{d7}$ | $\overline{d7}$ | $\overline{d7}$ |
| *161 | 1 | d7 | d7 | 0 |

*Indicates transmitted output, 121 is the most significant bit.

In the above example for case I it was assumed that D1 and D2 were equal to 0 and D3 is equal to 1. It will be apparent that it does not matter which one or if all of D1, D2, and D3 are 1's, because any one will make the outputs of gates G1 and G2 equal to 0, thus making the output 32 of gate G3 equal to 1 thereby putting to 1 on the input 601 of gate G6 causing its output to be 0. With respect to case IV it will also be apparent that any one or more of D1, D2, or D3 may be 0. In the example above D3 has been set equal to 0. It can be seen that the output 121 of gate G12 must be 0, therefore both inputs 1201 and 1202 must be 1's. In order for that condition to be met there must be two 0's applied at inputs 501 and 502 of gate G5. The zero at input 502 is a consequence of there being overflow, that is, the $\overline{B_{OUT}1}$ output is 0. The other 0 may be traced back to the output 31 of gate G3. In order for this output to be 0 both inputs 301 and 302 must be 0. For this to occur there must be at least one 1 at the inputs of gates G1 and G2, respectively. There is automatically a 1 at one of the inputs of gate G1, namely input 111 because there is overflow and the output $B_{OUT}1$ is equal to 1. As to gate G2, if any one or all of D1, D2, or D3 is a 0 then the outputs $\overline{D1}$, $\overline{D2}$, or $\overline{D3}$ will be 1 thereby supplying the necessary 1 at one of the inputs of gate G2.

Figure 3:
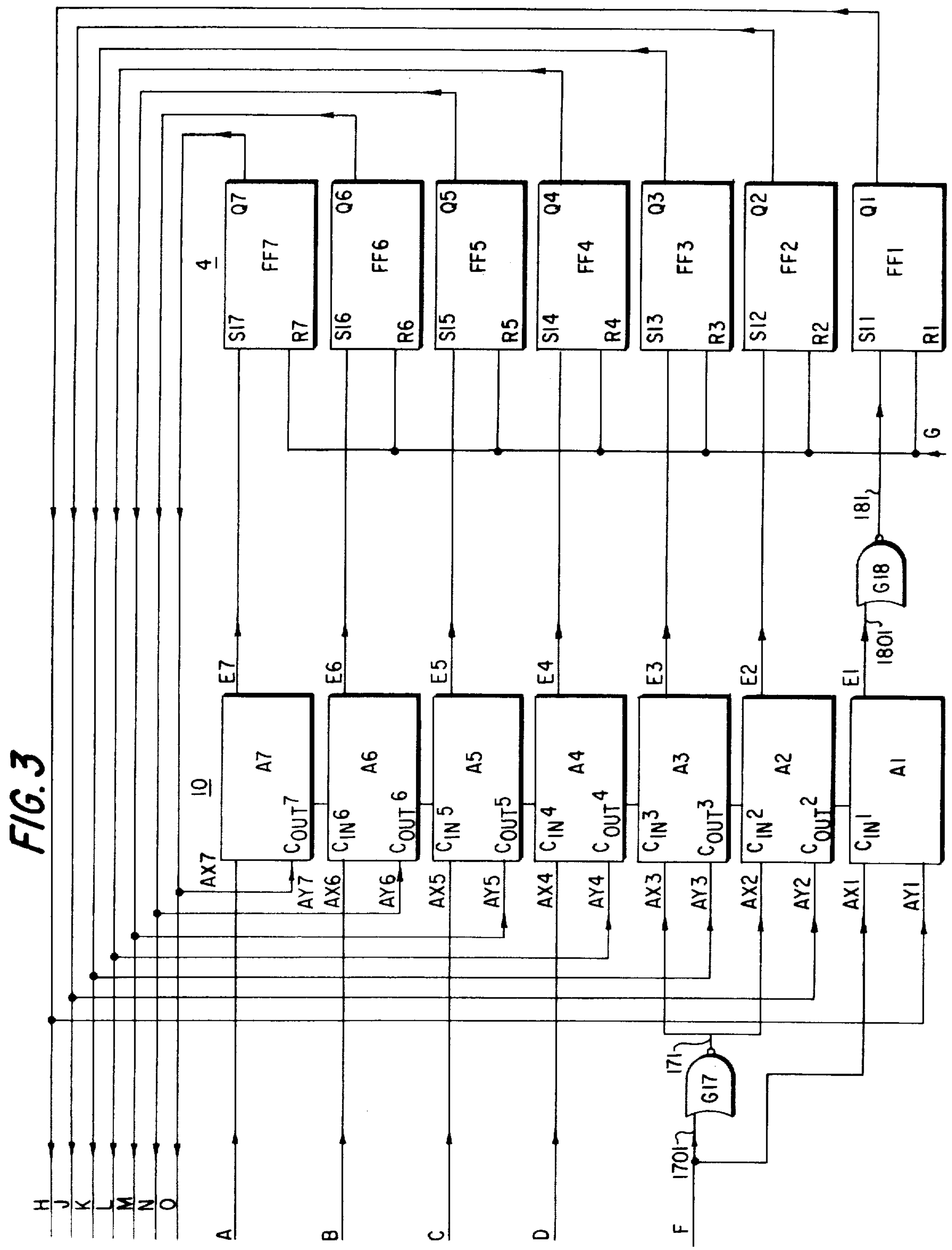
FIG. 3 is a block diagram showing in greater detail a further part of the transmitter portion of the system of FIG. 1.

Referring now to FIG. 3, the feedback loop circuit logic of the transmitter section 1 comprising digital adder logic 10, logic 9 and storage register 4 is shown. Adder 10 includes adder units A1 through A7 and storage register 4 includes flip-flops FF1 through FF7. The "carry-in" $C_{IN}1$ of adder A1 is connected to "carry-out" $C_{OUT}2$ of adder 2, and so on up the line. Thus if adder A7 has 1's at AX7 and AY7, the sum E7 is 0 and a 1 is produced at $C_{OUT}7$ and $C_{IN}6$. A table for adder A6, for example would be:

| AX6 | AY6 | $C_{IN}6$ | E6 | $C_{OUT}6$ |
|---|---|---|---|---|
| 0 | 0 | 0 | 0 | 0 |
| 0 | 1 | 0 | 1 | 0 |
| 1 | 0 | 0 | 1 | 0 |
| 1 | 1 | 0 | 0 | 1 |
| 0 | 0 | 1 | 1 | 0 |
| 0 | 1 | 1 | 0 | 1 |
| 1 | 0 | 1 | 0 | 1 |
| 1 | 1 | 1 | 1 | 1 |

A logic circuit 9 is included on the line carrying the most significant bit on line F from the output of the subtraction algorithm logic circuit 5 and includes an inverter OR gate G17. The line A bit is applied to input AX7 of adder A7, the line B bit is applied to the AX6 input of adder A6, the line C bit is applied to the AX5 input of adder A5, the line D bit is applied to the input AX4 of adder A4, the line F bit (D3) is applied to the input 1701 of inverter gate G17 and the inverted output $\overline{D3}$ at output 171 is applied to input AX3 of adder A3 and to input AX2 of adder A2. The D3 bit on line F is also applied directly to input AX1 of adder A1. Thus gate G17 is used in an arrangement to provide a *n*-bit word in response to the (two) bit word input. The AY1 through AY7 inputs of adders A1 through A7 are the feedback outputs from storage register flip-flops FF1 through FF7. The outputs of adders A2 through A7 designated E2, through E7 are applied directly to the set inputs S12 through S17 of storage flip-flops FF2 through FF7. The output E1 of adder A1 is applied to input 1801 of inverter OR gate G18 whose output 181 is applied to input S11 of flip-flop FF1. By inverting the most significant bit after addition, the process of adding and subtracting with adders only by means of complements is effected as noted above. The reset inputs R1 through R7 are reset by pulses on line G. The function of the reset pulse in the overall system operation is described in greater detail hereinafter. The flip-flop outputs Q1 through Q7 are fed back on lines H, J, K, L, M, N, and O, respectively, to the inputs of the adders A1 – A7 and are also fed back as the SY1 through SY7 inputs to subtractors S1 through S7, as described above.

In actual practice subtractor register 3 and adder logic 10 may be constructed on logic module cards using Motorola MC1021 integrated circuits as subtractors S1 – S7 and Motorola MC1019 integrated circuits as adders A1 – A7. Construction practice set forth in an article "High-Speed Digital Logic for Satellite Communications," by O. Gene Gabbard in Electro-Technology, April, 1969, pp.59–65 permits high speed operations required for television processing at a 10 MHz sampling rate.

Figure 4:
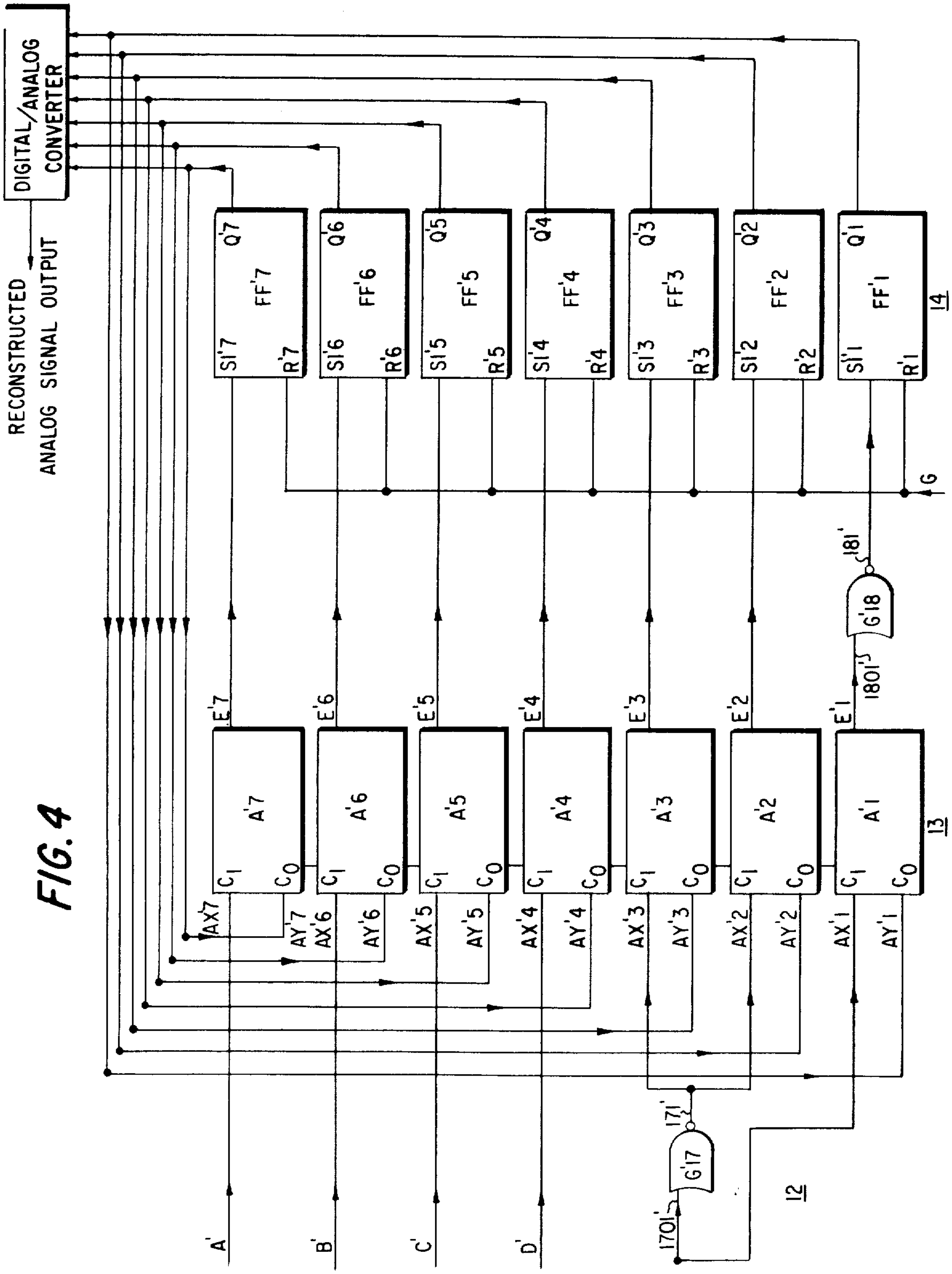
FIG. 4 is a block diagram showing in greater detail the receiver portion of the system of FIG. 1.

FIG. 4 shows a more detailed block diagram of that portion of the receiver following demultiplexer 11. It will be noted that the circuit is identical to that of FIG. 3 except for the addition of the digital/analog (D/A) converter, and that the circuit otherwise corresponds directly to the logic 9, adder 10, and storage register 4 of the transmitter portion 1. The corresponding portions of the receiver section have been designated G'17 (logic circuit 12), A'1 - A'7 (digital adder logic 13) G'18, and FF'1 – FF'7 (storage register 14).

As an example of system operation, the two extreme cases, will be traced through the system. The two cases are (1) when all 0's are stored in the registers 4 and 14 and the maximum level analog signal is applied to the system input, and (2) when all 1's are stored in registers 4 and 14 and the lowest level analog signal is applied to the system input.

| Case I | Cycle 1 | Cycle 2 | Cycle 3 | Cycle 4 |
|---|---|---|---|---|
| A/D out | 1111111 | 1111111 | 1111111 | 1111111 |
| FF1-7 | 0000000 | 0001111 | 0011110 | 0101101 |
| D1-D7 | 1111111 | 1110000 | 1100001 | 1010010 |
| Algorithm | I | I | I | I |
| Transmit | 11111 | 11111 | 11111 | 11111 |
| X1-X7 | 1001111 | 1001111 | 1001111 | 1001111 |
| E1-E7 | 1001111 | 1011110 | 1101101 | 1111100 |
| FF1-FF7 | 0001111 | 0011110 | 0101101 | 0111100 |

| Case I | Cycle 5 | Cycle 6 | Cycle 7 | Cycle 8 |
|---|---|---|---|---|
| A/D out | 1111111 | 1111111 | 1111111 | 1111111 |
| FF1-7 | 0111100 | 1001011 | 1011010 | 1101001 |
| D1-D7 | 1000011 | 0110100 | 0100101 | 0010110 |
| Algorithm | I | I | I | I |
| Transmit | 11111 | 11111 | 11111 | 11111 |
| X1-X7 | 1001111 | 1001111 | 1001111 | 1001111 |
| E1-E7 | 0001011 | 0011010 | 0101011 | 0111010 |
| FF1-FF7 | 1001011 | 1011010 | 1101001 | 1111000 |

| Case I | Cycle 9 |
|---|---|
| A/D out | 1111111 |
| FF1-7 | 1111000 |
| D1-D7 | 0000111 |
| Algorithm | II |
| Transmit | 10111 |
| X1-X7 | 1000111 |
| E1-E7 | 0111111 |
| FF1-FF7 | 1111111 |

| Case II | Cycle 1 | Cycle 2 | Cycle 3 | Cycle 4 |
|---|---|---|---|---|
| A/D out | 0000000 | 0000000 | 0000000 | 0000000 |
| FF1-7 | 1111111 | 1101111 | 1011111 | 1001111 |
| D1-D7 | *0000001 | *0010001 | *0100001 | *0110001 |
| Algorithm | IV | IV | IV | IV |
| Transmit | 00000 | 00000 | 00000 | 00000 |
| X1-X7 | 0110000 | 0110000 | 0110000 | 0110000 |
| E1-E7 | 0101111 | 0011111 | 0001111 | 1111111 |
| FF1-FF7 | 1101111 | 1011111 | 1001111 | 0111111 |

| Case II | Cycle 5 | Cycle 6 | Cycle 7 | Cycle 8 |
|---|---|---|---|---|
| A/D out | 0000000 | 0000000 | 0000000 | 0000000 |
| FF1-7 | 0111111 | 0101111 | 0011111 | 0001111 |
| D1-D7 | *1000001 | *1010001 | *1100001 | *1110001 |
| Algorithm | IV | IV | IV | III |
| Transmit | 00000 | 00000 | 00000 | 00001 |
| X1-X7 | 0110000 | 0110000 | 0110000 | 0110001 |
| E1-E7 | 1101111 | 1011111 | 1001111 | 1000000 |
| FF1-FF7 | 0101111 | 0011111 | 0001111 | 0000000 |

*Overflow.

Because the transmitted signal is applied to the digital feedback loop in transmitter 1 and to the receiver 8, the bits stored in FF1 – FF7 will also be present in FF'1 – FF'7 of the receiver at a fixed time later (depending on delay in the channel 7 and system delay in the several registers), assuming an error free transmission path. Thus after nine cycles in case 1, and eight cycles in case 2, the original input is reconstructed at the receiver. One more cycle is required in the case I positive direction because the maximum positive steps in a cycle is 15 since the case of zero difference is included in the 16 positive five bit code words, whereas the full negative sweep is done in only eight cycles because the maximum negative cycle is 16 steps. For a given reference point $A_{n-1}$ in the mid part of the system dynamic range, there is therefore a plus and minus capability of 31 steps or nominally a fourth of the total dynamic range.

Figure 5:
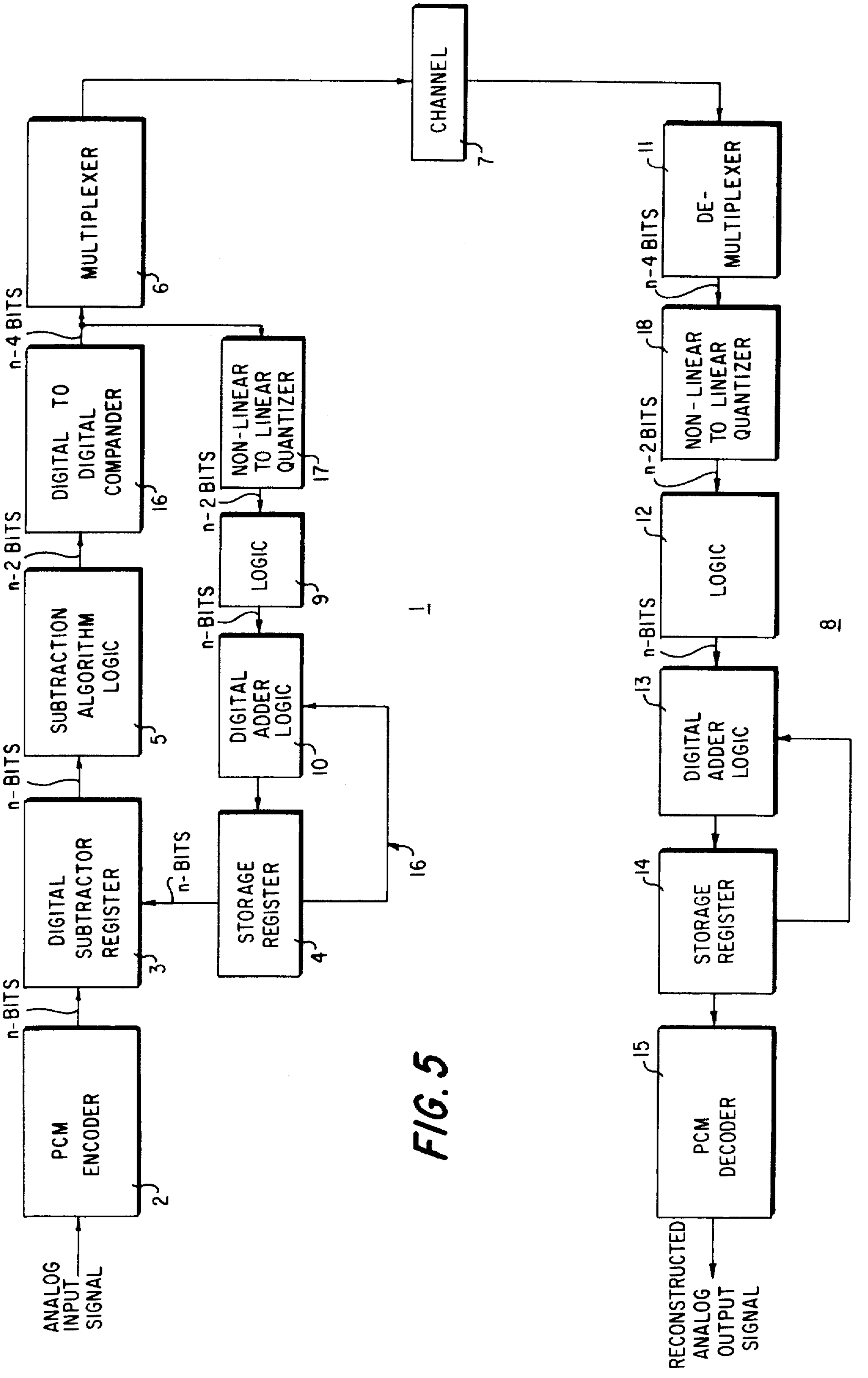
FIG. 5 shows a block diagram of a non-linear embodiment of the DPCM system according to this invention.

Referring now to FIG. 5, an alternative embodiment of the DPCM system employing non-linear companding is shown. FIG. 5 is similar to FIG. 1, with the additions of three elements: a conventional digital-to-digital compander 16 positioned between the subtraction algorithm logic 5 and the digital feedback loops; a conventional non-linear to linear quantizer 17 positioned in the digital feedback loop before logic 9; and a second conventional non-linear to linear quantizer 18 positioned between demultiplexer 11 and logic 12 in the receiver 8 of the system. The other elements are numbered as in FIG. 1.

Basically the operation of the non-linear DPCM embodiment is the same, however further advantages in signal-to-noise (S/N) ratio are achieved because the characteristics of compander 16 are chosen to provide very small step sizes near the reference point.

PCM encoder 2 samples so as to provide step sizes as small or smaller than the smallest step size of the non-linear code chosen. There are many possible non-linear codes that may be used, for example, logarithmic or square law. The PCM encoder output is an $n$-bit word, which in a practical system could be nine bits. The subtraction algorithm logic 5 output remains $n$ two-bits or seven-bits as an example. The compander 16 output will be $n$ four-bits or five-bits as an example. For small step differences the five-bit code will have the resolution of the original nine-bit digital encoder signal, enhancing the S/N for small signals differences that are most likely encountered in television or other signals having high spectral correlation.

In the feedback loops of the transmitter portion 1 and the receiver portion 8, the non-linear to linear quantizer 17 connects the $n$ four-bit signal back into a linearly coded $n$ two-bit signal for reconstruction in the same manner described above in the linear embodiment.

FIGS. 6 – 18 illustrate the operation of a normal analog TV system, conventional PCM, and a DPCM system according to this invention. In order to produce these photographs, a slide photograph was made of the subject, then a videotape recording was made of the slide. The videotape reproducer output was then used as a constant non-varying video source for application to the test set-ups. The final photographs of FIGS. 6–18 were taken off of a conventional TV studio monitor.

Figure 6:
FIG. 6 shows a television signal received through an analog system with no signal processing.
Figure 7:
FIGS. 7–13 show a television signal processed in a conventional PCM system with different bit lengths.
Figure 8:

In FIG. 6, the video signal was run through a straight analog amplifier to the monitor without signal processing. This figure will serve as a reference for the remaining FIGS. 7–18.

In FIGS. 7–13, the video signal was processed in a conventional PCM system, i.e., analog signal into conventional PCM encoder then back to analog through a conventional PCM decoder. The bit length of the PCM code words was varied; the letters "NI," "N2," etc indicating normal PCM and the bit length. Thus N2 is normal PCM with a two bit word.

In FIGS. 14–18, in the video signal was processed in a DPCM system according to the linear embodiment of the invention disclosed herein. "D1" means, for example, DPCM, one bit.

Figure 9:
Figure 10:
Figure 11:
Figure 12:
Figure 13:
Figure 14:
FIGS. 14–18 show a television signal processed in a linear DPCM system according to this invention with different bit lengths.
Figure 15:
Figure 16:
Figure 17:
Figure 18:

Although subjective evaluations enter into consideration it appears, generally speaking, that the reproduction in FIG. 14 (D1) is comparable to that of FIG. 9 (N3). Thus there is at least a two-bit advantage in the DPCM system.

As the DPCM bit length increases the picture quality appears to exceed that of the normal PCM with two additional bits. For example, the quality of FIG. 18 (D5) seems to be better than that of FIG. 13 (N7). As a direct comparison, FIGS. 7 and 14 should be compared to illustrate a one bit transmission by normal and differential PCM, respectively.

It will be apparent that the system described is subject to many variations. For example, the system is in no way limited to use with a television analog input. Furthermore, the number of bits truncated and transmitted may be chosen as $(n-x)$, where $x$ may equal 1, 2, 3, 4, etc., depending on the quality of the received signal desired.

The linear embodiment of the invention thus described has been found to provide approximately 11 db gain in S/N over a standard PCM system and the non-linear embodiment has been found to provide approximately an additional 3 db gain. Moreover, the all-digital logic operation provides small propagation delay permitting operation with wide band input signals such as full bandwidth television. Also, the inherent advantages of digital circuitry are realized. For example, the inaccuracies of analog memory devices are eliminated.

What is claimed is:

1. A method of converting successive identifying digital code words, wherein each digital code word is *n*-bit length and wherein said identifying digital code words represent an analog signal, into second digital code words representative of said analog signal, comprising the steps of:
  a. storing a reference digital code word;
  b. digitally comparing an identifying digital code word with said reference digital code word and generating an output digital code word representative of the difference between said identifying and reference digital code words; and
  c. altering said reference digital code word with said generated difference digital code word.

2. The method of claim 1 wherein the step of comparing and generating comprises subtracting said reference digital code word from said identifying digital code word to obtain an *n*-bit difference digital code word.

3. The method of claim 2 further comprising the steps of:
  a. generating a first digital code word of *n–x* bit length representing a pre determined magnitude if the difference obtained by said subtraction is positive and greater than said predetermined magnitude;
  b. generating a second digital code word of *n–x* bit length representing said predetermined magnitude if the difference obtained by said subtraction is negative and greater than said predetermined magnitude; and
  c. generating a third digital code word of n–14 x bit length representing the actual difference if the difference is a magnitude less than said predetermined magnitude, wherein *x* = the number of most significant bits truncated from the *n*-bit difference digital code word.

4. The method of claim 3 wherein the step of altering comprises digitally adding said difference digital code word to said reference digital code word and storing the result as a new reference digital code word.

5. In a differential pulse code modulation transmission system wherein a digital code word representing a difference between a present analog sample and a previous analog sample is transmitted, the method of reconstructing the present analog sample, at a receiver, comprising the steps of:
  a. storing a reference digital code word representative of said previous analog sample;
  b. digitally combining said stored reference digital code word with said difference digital code word to provide a new reference digital code word;
  c. storing said new reference digital code word; and
  d. converting said new reference digital code word into an analog signal whereby said present analog signal is reconstructed.

6. The method of claim 5 wherein the step of combining comprises digitally adding adding said stored reference digital code word to said difference digital code word.

7. In a differential pulse code modulation transmission system wherein a difference digital code word of *n*-bit length representing the difference between a present analog sample and a previous analog sample is generated and wherein a difference digital code word of *n–x* bit length is transmitted, wherein *x* = the number of most significant bits truncated from said *n*-bit difference digital code word, the method of reconstructing the present analog sample, at a receiver, comprising the steps of:
  a. storing a reference digital code word representing said previous analog sample;
  b. reconverting said difference digital code word of *n–x* bit length to the difference digital code word of *n*-bit length;
  c. digitally adding said stored reference digital code word with said reconverted difference digital code word to provide a new reference digital code word;
  d. storing said new reference digital code word; and
  e. converting said new reference digital code word into an analog signal, whereby said present analog signal is reconstructed.

8. Apparatus for converting successive identifying digital code words, wherein each digital code word is *n*-bit length and wherein said identifying digital code words represent an analog signal, into second digital code words representative of said analog signal, comprising:
  a. storage means for storing reference digital code word;
  b. means, responsive to said identifying digital code word and said stored reference digital code word, for generating a difference digital code word representative of the difference between said identifying digital code word and said stored reference digital code word; and
  c. means for varying said stored reference digital code word with said difference digital code word.

9. The apparatus of claim 8 wherein said difference digital code word generating means comprises means for subtracting said stored reference digital code word from said identifying digital code word to obtain an *n*-bit digital code word.

10. The apparatus of claim 9 further comprising:
  a. means for generating a first digital code word of *n–x* bit length representing a predetermined magnitude if the difference obtained by said subtraction is positive and greater than said predetermined magnitude;
  b. means for generating a second digital code word of *n–x* bit length representing said predetermined magnitude if the difference obtained by said subtraction is negative and greater than the predetermined magnitude; and
  c. means for generating a third digital code word of *n–x* bit length representing the actual difference if the difference obtained by said subtraction is a magnitude less than the predetermined magnitude, wherein *x* = the number of most significant bits truncated from the *n*-bit difference digital code word.

11. The apparatus of claim 10 wherein said means for varying comprises means for digitally adding said difference digital code word to said reference digital code word and storing the result as a new reference digital code word.

12. In a differential pulse code modulation transmission system wherein a digital code word representing a difference between a present analog sample and a previous analog sample is transmitted, apparatus, at a receiver, for reconstructing the present analog sample, comprising:

a. means for storing a reference digital code word representing said previous analog sample;
b. means for digitally combining said stored reference digital code word with said difference digital code word to provide a new reference digital code word;
c. means for storing said new reference digital code word; and
d. means for converting said new reference digital code word into an analog signal, whereby said present analog signal is reconstructed.

13. The apparatus of claim 12 wherein the means for combining comprises digitally adding said stored reference digital code word to said difference digital code word.

14. In a differential pulse code modulation transmission system wherein a difference digital code word of $n$-bit length representing the difference between a present analog sample and a previous analog sample is generated and wherein a difference digital code word of $n-x$ bit length is transmitted, wherein $x$ = the number of most significant bits truncated from said $n$-bit difference digital code word, apparatus, at a receiver, for reconstructing the present analog sample, comprising:

a. means for storing a reference digital code word;
b. means for reconverting said difference digital code word of $n-x$ bit length to the difference digital code word of $n$-bit length;
c. means for digitally adding said stored reference digital code word with said reconverted difference digital code word to provide a new reference digital code word; into an analog signal, whereby said present analog signal ;
d. means for storing said new reference digital code word; and
e. means for converting said new reference digital code word into an analog signal, whereby said present analog signal is reconstructed.

* * * * *